United States Patent [19]
Sheynblat

[11] Patent Number: 5,999,124
[45] Date of Patent: Dec. 7, 1999

[54] SATELLITE POSITIONING SYSTEM AUGMENTATION WITH WIRELESS COMMUNICATION SIGNALS

[75] Inventor: Leonid Sheynblat, Belmont, Calif.

[73] Assignee: SnapTrack, Inc,, San Jose, Calif.

[21] Appl. No.: 09/064,673

[22] Filed: Apr. 22, 1998

[51] Int. Cl.[6] ............................. G01S 5/02; H04B 7/185
[52] U.S. Cl. ............................. 342/357.09; 342/357.01; 342/357.06; 701/213
[58] Field of Search ......................... 342/357.01, 357.05, 342/357.06, 357.09, 457; 701/213

[56] References Cited

U.S. PATENT DOCUMENTS

| | | | |
|---|---|---|---|
| 5,327,144 | 7/1994 | Stilp et al. | 342/387 |
| 5,365,447 | 11/1994 | Dennis | 364/449 |
| 5,365,516 | 11/1994 | Jandrell | 370/18 |
| 5,422,813 | 6/1995 | Schuchman et al. | 364/449 |
| 5,512,908 | 4/1996 | Herrick | 342/387 |
| 5,604,765 | 2/1997 | Bruno et al. | 375/200 |
| 5,612,703 | 3/1997 | Mallinckrodt | 342/457 |
| 5,663,734 | 9/1997 | Krasner | 342/357 |
| 5,724,660 | 3/1998 | Kauser et al. | 455/456 |
| 5,736,964 | 4/1998 | Ghosh et al. | 342/457 |
| 5,774,829 | 6/1998 | Cisneros et al. | 701/213 |

OTHER PUBLICATIONS

Christopher Drane, et al. "Positioning GSM Telephones," *IEEE Communications Magazine*, Apr. 1988, pp. 46–54, 59.
PCT International Search Report for Int'l Appln No. PCT/US99/07989 mailed Jul. 15, 1999.

*Primary Examiner*—Thomas H. Tarcza
*Assistant Examiner*—Dao L. Phan
*Attorney, Agent, or Firm*—Blakely, Sokoloff, Taylor & Zafman

[57] ABSTRACT

A method and apparatus for processing position information from satellite positioning system satellites and from cellular based communication signals. In one example of a method according to the invention, a SPS receiver receives SPS signals from at least one SPS satellite. This SPS receiver is coupled to and typically integrated with a communication system which receives and transmits messages in a cell based communication system. In this method, a message is transmitted in the cell based communication signals between a communication system and a first cell based transceiver. A time measurement which represents a time of travel of a message in the cell based communication signals between the cell based transceiver and the communication system is determined. Another time measurement which represents a time of travel of the SPS signals is also determined. A position of the SPS receiver is determined from a combination of at least the time measurement which represents the time of travel of a message in the cell based communication signals and from a time measurement which represents a time of travel of the SPS signals. The cell based communication signals are capable of communicating data messages in a two-way direction in one embodiment between the cell based transceiver and the communication system.

38 Claims, 8 Drawing Sheets

SATELLITE POSITIONING SYSTEM AUGMENTATION WITH WIRELESS COMMUNICATION SIGNALS

BACKGROUND OF THE INVENTION

The present invention relates to satellite positioning systems which are combined with wireless communication systems and also relates to radio location techniques.

Wireless communications are rapidly augmenting conventional telephone communications. Wireless cell telephones or cellular telephones, as they are sometimes referred to, are a form of cell based or cellular based communication systems. These systems are capable of being used in many different locations. In conventional telephone communications, emergency 911 service has been in existence for a number of years and has evolved and been upgraded over time. Currently, for most wired telephone systems, an enhanced 911 service is available. In this service, the emergency center receiving the call automatically from the telephone system learns the phone number, location and identity of the calling party without having been provided this information by the calling party. In the case of a cell telephone, such enhanced 911 service is normally not possible. At the current time, an emergency center which receives a call dialed from a cellular telephone has no idea where the party is calling from. One proposed solution to provide an enhanced 911 service for cell telephones is to use the overlay of the cells in a cell based communication system. This overlay arises from the fact that the effective radio communication distances from one cell site to the next overlap to some extent. This is shown in FIG. 1. The cell based communication system 10 includes four cells 12, 14, 16, and 18 which overlap to the extent shown in FIG. 1. Each of these cells has been drawn around its respective wireless cell based transceiver which are shown as transceivers 21, 22, 23, and 24. These transceivers transmit and receive wireless cell based communication signals to and from the wireless mobile cell based communication systems, such as the wireless cell based mobile communication systems 26, 27, and 28 shown in FIG. 1. As is well known in the art, there are numerous cell based communication systems, such as the AMPS system and the CDMA system as well as the TDMA, GSM, PCS, and the ISM systems. Each of these systems share the basic cell based communication wireless approach that consists of base sites (also referred to as cell sites) transmitting signals and deployed in the cellular topology where each cell is defined by the coverage zone of signals to and from its cell site (wireless cell based transceiver) and with some cells possibly overlapping other cells. The overlap of the cells typically will allow a radio position operation to be performed at least in the overlap areas. For example, the position of the wireless cell based mobile communication system 27 shown in FIG. 1 may be determined by determining the time of travel of communication signals between the cell site 22 and the mobile system 27 and similarly the time of travel of wireless cell based communication signals between the mobile system 27 and the transceiver 23. If certain assumptions (such as approximate altitude) are made and an angle of arrival (AOA) technique is used, the position of a mobile cell based system may be determined with as few as two wireless cell based transceivers being in radio communication with the mobile unit. Typically, however, at least three radio communication links with three different wireless cell based transceivers are required in order to obtain a two-dimension position solution. There are numerous examples in the prior art which describe the use of the cellular overlay as a way to provide radio position operations for mobile cellular based communication systems. One approach is referred to as a time of arrival (TOA) technique and another approach is referred to as a time difference of arrival (TDOA) technique.

While the infrastructure may to some extent already exist for the use of the cellular overlay to provide radio position, it turns out that the overlay is typically too small among cells in order to provide adequate coverage over the various possible positions of a mobile unit. This can be seen in FIG. 1 where the mobile unit 28 may only receive and transmit signals with one wireless cell based transceiver, the transceiver 22, and not receive signals from (or be able to transmit signals to) the other transceivers or cell sites. In this situation, the position of the wireless unit 28 can be defined no better than a circle surrounding the cell site 22 and this in fact may not be possible due to errors in the system and due to the inability to determine time accurately enough at the transmitting and receiving systems.

Another approach to determining the position of a mobile communication system is to incorporate a satellite positioning system (SPS) such as the Global Positioning System (GPS) into the same enclosure or coupled tightly with the communication system. Numerous references have described this approach in which the GPS system by itself is used to determine the position of the integrated unit. An example of such an integrated unit is described in U.S. Pat. No. 5,663,734 by Norman F. Krasner. In many such integrated systems which include a GPS receiver and a wireless communication system, the GPS receiver is a conventional correlator based receiver which often has difficulty collecting GPS signals from enough GPS satellites to determine a position of the GPS receiver. GPS receivers typically do not perform well in environments where there is blockage of the GPS signals from the GPS satellites. This blockage may be only a tree overhead, and yet the GPS receiver may not be able to acquire and track GPS satellites in such an environment. Consequently, there are many situations where an integrated GPS receiver and communication system will not be able to provide a position which could then be transmitted through the communication system back to a 911 operator at a public safety answering point (PSAP).

Another approach in the prior art which attempts to provide a position for a wireless communication system is described in U.S. Pat. No. 5,604,765. This patent discloses a technique of embedding a CDMA navigation signal into the existing wireless communication system in order to provide navigational capability. The mobile unit includes a GPS receiver and also includes a communication system which can receive GPS-like navigation signals which have been embedded into communication broadcasts from cellular and/or other wireless basestation transmitters. In this technique, a mobile system can utilize both the GPS system and the communication system. That is, the communication system, when there is blockage of the GPS satellites, may use the embedded GPS-like signals in the cellular communication signal to augment or replace the GPS signals from the GPS satellites in order to provide a position. While this technique described in U.S. Pat. No. 5,604,765 provides an advantage over a cell phone which uses merely the cellular overlay to perform radio positioning and also provides an advantage over a mobile unit which merely uses the GPS system to provide a position, this technique of embedding a GPS-like signal into the wireless cellular signals requires modifications to the existing broadcast signals and thus would require considerable modification of the infrastructure of a cell based communication system.

U.S. Pat. No. 5,327,144 describes another positioning system which uses cellular transmissions of a cellular telephone to determine the time difference of arrival (TDOA) of the transmitted signals; these time differences are obtained by using a GPS receiver to time stamp the cellular transmissions in order to measure the time differences between cellular transmissions between the cellular telephone and several cell sites. However, the GPS receiver is not used to determine pseudoranges between a GPS receiver in the cellular telephone and GPS satellites. U.S. Pat. No. 5,512, 908 also describes a TDOA system which uses cellular transmissions to measure the cell phone's location from the time differences of arrival of the cellular transmissions; again, GPS signals are used in the cell sites to time stamp the signals in order to measure the time difference in signal travel time. The GPS signals are not used to determine pseudoranges between a GPS receiver in the cellular phone and GPS satellites. U.S. Pat. No. 5,612,703 describes a positioning system in a cellular communications system based on round trip signal time measurements. U.S. Pat. No. 5,724,660 describes a method for determining a position of a cellular telephone by measuring the signal strength of cellular transmissions between the telephone and cell sites; this position is then compared to a position determined from a GPS receiver which separately attempts to determine a position. Thus, this patent determines a position by comparing a position derived from signal strength measurements to a position derived from GPS measurements.

Thus it is desirable to provide a system which is capable of position determination in a variety of wireless environments and which may use both the global satellite navigation system, such as the GPS system, and a wireless system deployed in a cellular configuration.

SUMMARY OF THE INVENTION

The present invention provides for methods and apparatuses for processing position information with a satellite positioning system (SPS) receiver and by using time measurements of messages in a cell based communication signal. In one example of a method of the invention, a SPS receiver receives SPS signals from at least one SPS satellite. Cell-based communication signals are transmitted between a communication system which is coupled to the SPS receiver and a first cell based transceiver which is remotely positioned relative to the SPS receiver. These cell based communication signals are wireless communications. A first time measurement is determined, and this time measurement represents a time of travel of a message in the cell based communication signals between the first cell based transceiver and the communication system. A second time measurement, which may be referred to as a pseudorange to a SPS satellite is also determined, and it represents a time of travel of the SPS signals from the SPS satellite to the SPS receiver. A position is then determined of the SPS receiver from at least the first time measurement and the second time measurement and usually a third time measurement. The cell based communication signals on which time measurements are being performed are capable of communicating data messages in a two-way direction in one embodiment between the first cell based transceiver and the communication system.

In one particular example of a method of the present invention, pseudoranges to SPS satellites and cellular pseudoranges to cell sites are used together to provide a position for the mobile integrated unit. If, in one example, one GPS satellite is in view and two wireless cell based transceivers (cell sites) are in radio communication (or can be in radio communication) with a mobile unit, then effectively three pseudoranges may be used to determine the position of the mobile unit. The augmentation of the satellite positioning system with the wireless communication system is performed without embedding navigation signals which specify the position of the transmitter or are GPS-like signals into the cellular based communication signals. Thus, for example, the messages which are transmitted between the mobile unit and the cell site may be voice or data messages and these messages may be used to perform the time measurement for determining the cellular pseudoranges. These messages may be the 911 message or pseudorange messages describing pseudoranges to the SPS satellites or may be Doppler or other aiding information (e.g. satellite ephemeris information) being provided to a mobile unit.

In another example of the invention, an integrated system includes a SPS receiver and a communication system such as a cellular based communication transceiver. The SPS receiver is capable of receiving SPS and providing data (e.g. pseudoranges) for determining a first time measurement which represents a time of travel of SPS signals from a SPS satellite to said SPS receiver. The communication system, which is coupled to the SPS receiver, is capable of communicating in a wireless manner with a remotely located cell based transceiver and is capable of providing data (e.g. a time stamp or a cellular pseudorange) for determining a second time measurement which represents a time of travel of a message in the cell based communication signals between the communication system and the remotely located cell based transceiver. The cell based communication signals are capable of communicating messages (e.g. voice or data) between said communication system and said remotely located cell based transceiver. A position of the mobile integrated system is determined from a combination of at least the first and the second time measurements, and this combination is in a measurement domain defined by these time measurements.

Various other aspects and embodiments of the present invention are further described below.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
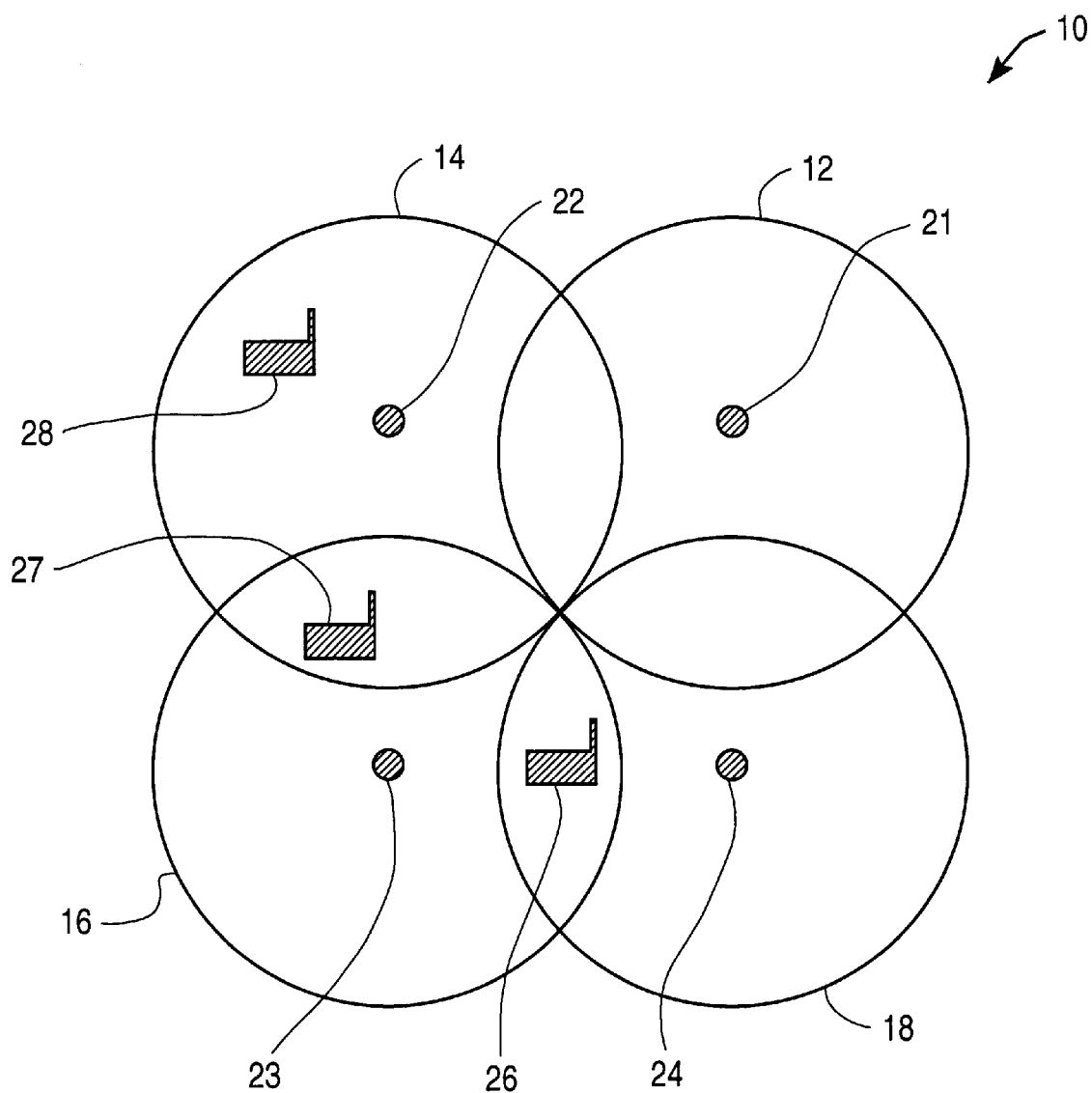
FIG. 1 illustrates a cell based communication system which shows the overlay which may be possible between adjacent cell sites.

The present invention relates to the use of cell based communication signals to augment satellite position information in order to determine a location of a mobile receiver having a satellite positioning receiver and a cell based communication system. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

In one embodiment of the present invention, a system according to the invention consists of two elements: (1) a satellite positioning system, such as GPS, and (2) a wireless radio communication system deployed in a cell based (sometimes referred to as cellular) configuration in which each cell is defined by its signal coverage zone, with some cells possibly overlapping. An example of a cell based wireless radio communication system is the U.S. Cellular Telephone (AMPS) signal. Other examples of wireless cell based communication systems include the CDMA, TDMA, GSM, PCS, and ISM systems, all of which are well known. Any wireless cell based communication system that includes base sites transmitting and/or receiving signals and deployed in a cellular topology may be used in the present invention to augment satellite positioning systems, such as the GPS system.

The cell based communication signals may be used to derive a time of travel of a message on the cell based communication signals which travels between a cell site and an integrated wireless communication system/SPS receiver. The time of travel of the message in the cell based communication signal defines a sphere in three dimensions or a circle in two dimensions with the center at the cell site and the radius equal to a distance traveled by a radio wave during the measured time period. These time measurements are used to augment the satellite pseudorange measurements according to one embodiment, particularly when there is blockage of SPS signals from SPS satellites or in other situations where the SPS system does not provide adequate position information.

In one embodiment, the integrated wireless communication system/SPS receiver may derive the positioning or time of arrival information from all available signals, including SPS satellites and cell based wireless communication signals and transmit them together with corresponding timing information to a remote basestation such as a location server described below for position derivation. Since the positioning information (pseudorange measurements) can be derived from different sources, an appropriate weighting scheme can be used to weight the measurements according to their estimated errors to optimize the augmented solution. In an alternative embodiment, the integrated wireless communication system/SPS receiver may use the positioning information to compute its location without the assistance of a remote location server. It can then store the information in memory and/or display it to a user and/or transmit it to a called or calling party through the wireless cell based communication system.

If precise timing information is not available in the mobile integrated communication system/SPS receiver, then the time of arrival measurements may be forwarded to a location server or to some other site that has methods to derive the timing information, preferably from received satellite navigation signals which can be used to derive the precise timing of the transmission and receipt of the cell based communication signals.

A configuration of a mobile integrated communication system/GPS receiver together with a remotely located location server can be used to remove common mode errors in the time of arrival measurements. Some common mode errors could be due to satellite navigation system errors and some (in particular timing errors) could be due to system errors in the wireless communication system. In one case, the GPS time from the least attenuated satellite signal may be used to establish GPS time of collection of SPS signals which were used to determine the pseudoranges to the satellites and to establish GPS time at the location server. In this way, time at the location server and the time of the pseudorange measurements (e.g. when the SPS signals, from which the pseudoranges were determined, were collected) are derived from the same source and common mode errors will cancel out. In some instances, such as a digital CDMA cellular system, precise timing information is embedded in the CDMA cellular communication signals and this timing information can be used to derive the time of receipt of a message in the CDMA communication signal and a time of transmission of a message in the CDMA communication signal.

Figure 2:
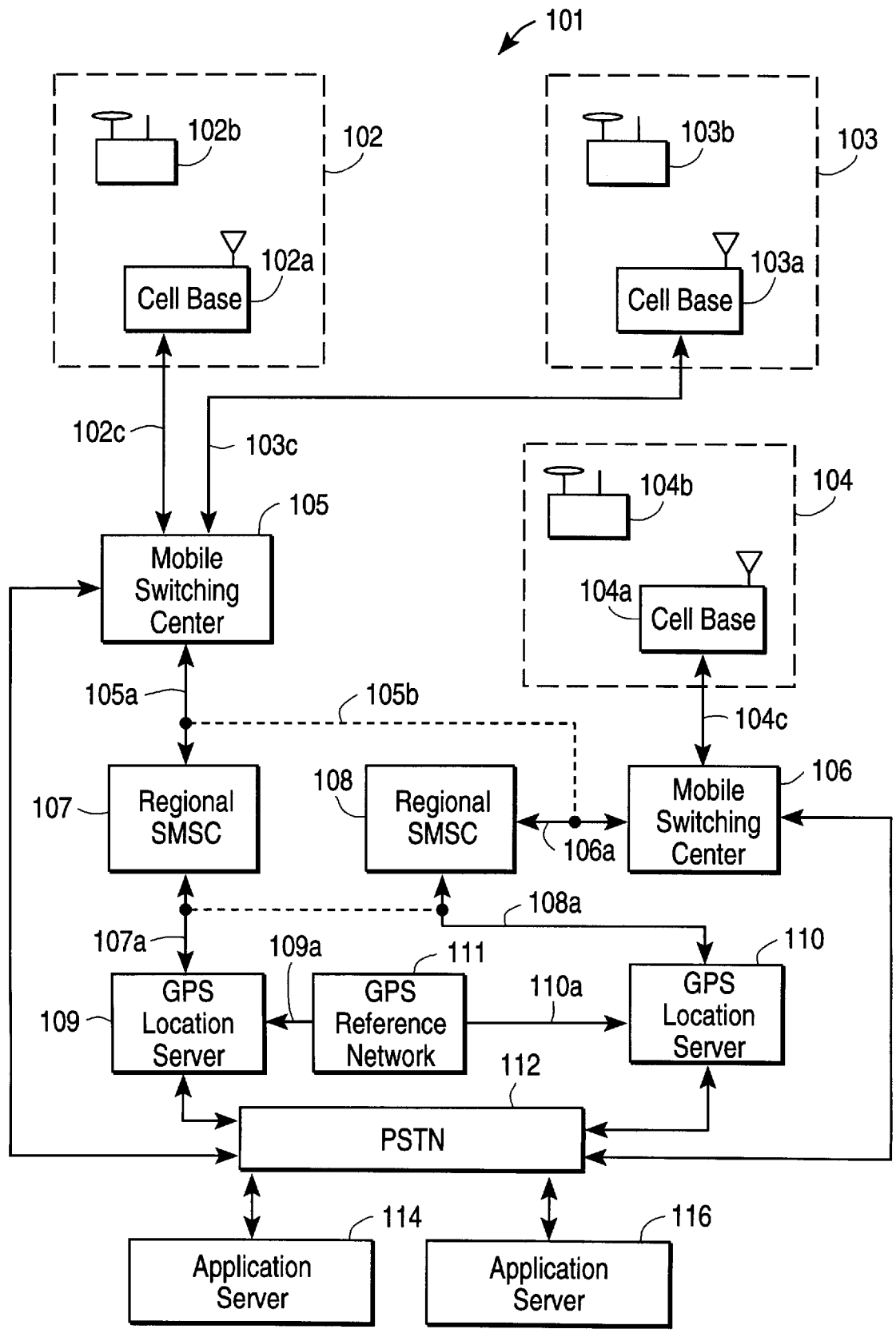
FIG. 2 shows an example according to the present invention of a location system which utilizes an SPS system in conjunction with a wireless communication system.
Figure 4:
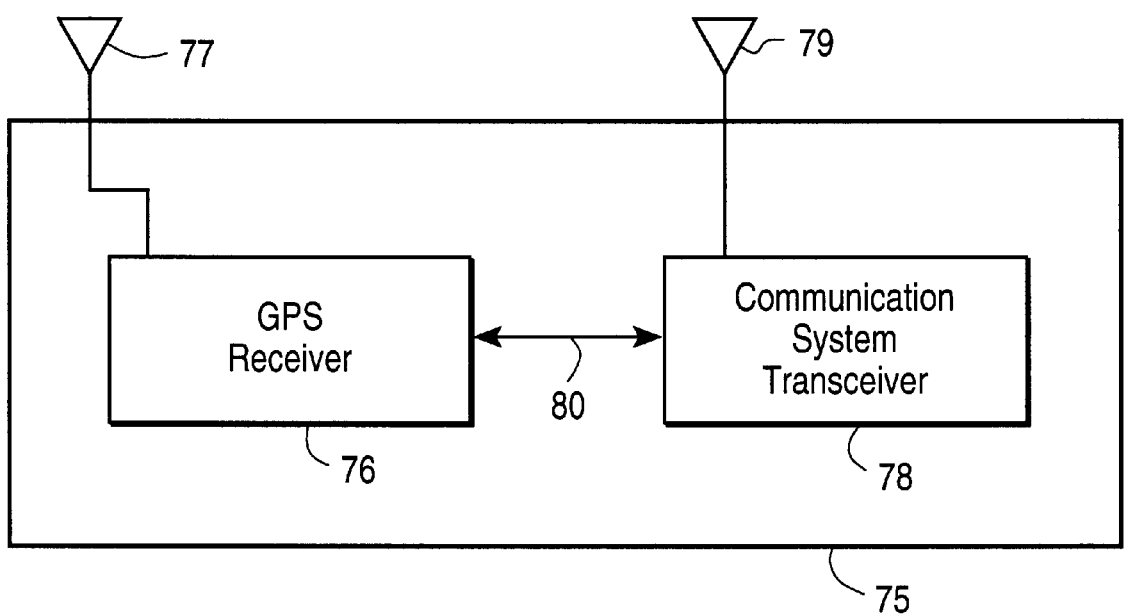
FIG. 4 shows an example of an integrated SPS receiver and communication system.

FIG. 2 shows one example of a system 101 of the present invention. The system includes a cell based communication system which includes a plurality of cell sites, each of which is designed to service a particular geographical region or location. Examples of such cellular based or cell based communication systems are well known in the art, such as the cell based telephone systems. It will be appreciated that FIG. 2 has not been drawn to show an overlap of cells as is shown in FIG. 1. However, the signal coverage zone of the cells may in fact overlap as in FIG. 1 but this is not required for the present invention. It will be appreciated that if the signal coverage zones of the cells do overlap, then additional aiding measurements from the cellular system are available for use according to the invention as described below. The cell based communication system as shown in FIG. 1 includes three cells 102, 103, and 104. It will be appreciated that a plurality of cells with corresponding cell sites and/or cellular service areas may also be included in the system 101 and be coupled to one or more cell based switching centers, such as the mobile switching center 105 and the mobile switching center 106. Within each cell, such as the cell 102, there is a wireless cell basestation (sometimes referred to as a cell site or cell base) such as the cell basestation 102a which is designed to communicate through a wireless communication medium using cell based communication signals with a communication system, which typically includes a receiver and a transmitter for communicating by using the cell based communication signals and a mobile SPS receiver. This combined communication system and mobile SPS receiver provides a combined system such as the receiver 102b shown in FIG. 2. An example of such a combined system having a SPS receiver and a communication system is shown in FIG. 4 and may include both the SPS antenna 77 and a communication system antenna system 79. Each cell site is coupled typically to a mobile switching center (MSC). In FIG. 2, cell sites 102a and 103a are coupled to switching center 105 through connections 102c and 103c, respectively, and cell base 104a is coupled to a different mobile switching center 106 through connection 104c. These connections are typically wireline connections between the respective cell base and the mobile switching centers 105 and 106. Each cell base includes an antenna for communicating with communication systems serviced by the particular cell site/base. In one example, the cell site may be a cellular telephone cell site which communicates with mobile cellular telephones in the area serviced by the cell site.

In a typical embodiment of the present invention, the mobile SPS receiver, such as receiver 102b, includes a cell based communication system which is integrated with the SPS receiver such that both the SPS receiver and the communication system are enclosed in the same housing. One example of this is a cellular telephone having an integrated GPS receiver which shares common circuitry with the cellular telephone transceiver. When this combined system is used for cellular telephone communications, transmissions occur between the receiver 102b and the cell base 102a. Transmissions from the receiver 102b to the cell base 102a are then propagated over the connection 102c to the mobile switching center 105 and then to either another cellular telephone in a cell serviced by the mobile switching center 105 or through a connection (typically wired) to another telephone through the land-based telephone system/network 112. It will be appreciated that the term wired includes fiber optic and other non wireless connections such as copper cabling, etc. Transmissions from the other telephone which is communicating with the receiver 102b are conveyed from the mobile switching center 105 through the connection 102c and the cell site 102a back to the receiver 102b in the conventional manner. Typically, each cell base, such as cell base 102a, will include a SPS receiver (or at least be coupled to receive SPS time). The SPS receiver is used to time stamp the time of transmissions of messages from the cell base to a mobile unit and to time stamp the time of receipt of a message at the cell base from the mobile unit. In this way, the time of travel between the mobile unit and a cell base of a message in the cell based communication signals can be determined. This time of travel may be referred to as a cellular pseudorange. In one example of the invention, the time of transmission and time of receipt of a message is sent to a GPS location server which calculates the time of travel for the message to thereby determine the cellular pseudorange.

In the example of FIG. 2, each mobile switching center (MSC) is coupled to at least one regional short message service center (SMSC) through a network which in one embodiment is referred to as a Signaling System Number 7 (SS7) Network. This network is designed to allow short messages (e.g. control information and data) to be passed among elements of the telephone network. It will be understood that FIG. 2 shows one example and that it is possible for several MSC's to be coupled to one regional SMSC. The SS7 network is represented by connections 105a, 105b and 106a which interconnect MSC's 105 and 106 to regional SMSC's 107 and 108. The example of FIG. 2 also shows two GPS location servers 109 and 110 which are respectively coupled to regional SMSC 107 and regional SMSC 108 through connections 107a and 108a. In one embodiment of the distributed system of FIG. 2, the connections 107a and 108a are part of a permanent packet switched data network which interconnects various regional SMSC's with various GPS location servers. This allows each regional SMSC to act as a router to route requests for location services to whichever GPS location servers are available in case of congestion at a location server or failure of a location server. Thus, regional SMSC 107 may route location service requests from mobile GPS receiver 102b (e.g. the user of mobile GPS receiver 102b dials 911 on the integrated cell telephone) to the GPS location server 110 if location server 109 is congested or has failed or is otherwise unable to service the location service request.

Each GPS location server is typically coupled to a wide area network of GPS reference stations which provide differential GPS corrections and satellite ephemeris data to the GPS location servers. This wide area network of GPS reference stations, shown as GPS reference network 111, is typically coupled to each GPS location server through a dedicated packet switched data network. Hence, location server 109 receives data from the network 111 through connection 109a and server 110 receives data from network 111 through connection 110a. Alternatively, a GPS reference receiver may be used at each location server to provide satellite ephemeris, GPS measurements or local area differential corrections and GPS time to the GPS location server. As shown in FIG. 2, each GPS location server is also coupled to a public switched telephone network (PSTN) 112 to which two application servers 114 and 116 are coupled.

The two GPS location servers are, in one embodiment, used to determine the position of a mobile GPS receiver (e.g. receiver 102b) using GPS signals received by the mobile GPS receiver.

Each GPS location server will receive pseudoranges from a mobile GPS receiver and satellite ephemeris and differential corrections data from the GPS reference network and calculate a position for the mobile GPS receiver and then this position will be transmitted through the PSTN to one (or both) of the Application Servers where the position is presented (e.g. displayed on a map) to a user at the Application Server. Normally, the GPS location server calculates but does not present (e.g. by display) the position at the GPS location server. An application server may send a request, for the position of a particular GPS receiver in one of the cells, to a GPS location server which then initiates a conversation with a particular mobile GPS receiver through the mobile switching center in order to determine the position of the GPS receiver and report that position back to the particular application. In another embodiment, a position determination for a GPS receiver may be initiated by a user of a mobile GPS receiver; for example, the user of the mobile GPS receiver may press 911 (or some other button, such as a "locate" button) on the cell phone to indicate an emergency situation at the location of the mobile GPS receiver and this may initiate a location process in the manner described herein.

In an alternative embodiment in which a mobile SPS receiver determines its position, the GPS location server may cause location appropriate satellite ephemeris information to be transmitted to the mobile SPS receiver. This mobile SPS receiver determines satellite pseudoranges and calculates satellite positions from the received satellite ephemeris information and also receives or determines cellular pseudoranges (and the locations of cell sites with which it is communicating). Using the satellite pseudoranges, satellite positions, cellular pseudoranges and cell site positions, the mobile SPS receiver itself determines its position.

It should be noted that a cellular based or cell based communication system is a communication system which has more than one transmitter, each of which serves a different geographical area, which is predefined at any instant in time. Typically, each transmitter is a wireless transmitter which serves a cell which has a geographical radius of less than 20 miles, although the area covered depends on the particular cellular system. There are numerous types of cellular communication systems, such as cellular telephones, PCS (personal communication system), SMR (specialized mobile radio), one-way and two-way pager systems, RAM, ARDIS, and wireless packet data systems. Typically, the predefined geographical areas are referred to as cells and a plurality of cells are grouped together into a cellular service area and these pluralities of cells are coupled to one or more cellular switching centers which provide connections to land-based telephone systems and/or networks. A service area is often used for billing purposes. Hence, it may be the case that cells in more than one service area are connected to one switching center. Alternatively, it is sometimes the case that cells within one service area are connected to different switching centers, especially in dense population areas. In general, a service area is defined as a collection of cells within close geographical proximity to one another. Another class of cellular systems that fits the above description is satellite based, where the cellular basestations or cell sites are satellites that typically orbit the earth. In these systems, the cell sectors and service areas move as a function of time. Examples of such systems include Iridium, Globalstar, Orbcomm, and Odyssey.

Figure 3:
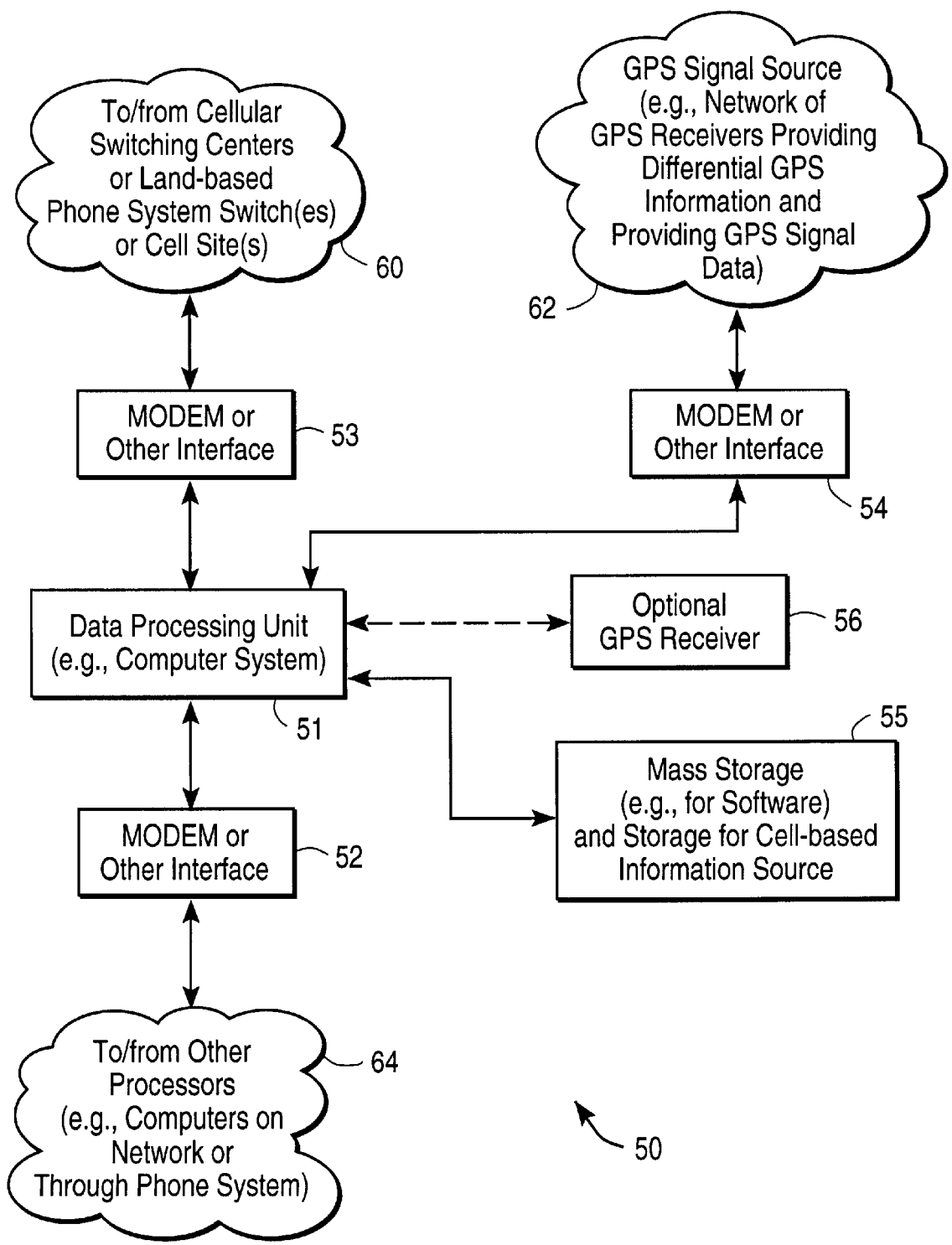
FIG. 3 shows an example of a location server which may be used according to the present invention.

FIG. 3 shows an example of a GPS location server 50 which may be used as the GPS server 109 or GPS server 110 in FIG. 2. The SPS location server 50 of FIG. 3 includes a data processing unit 51 which may be a fault-tolerant digital computer system. The SPS location server 50 also includes a modem or other communication interface 52 and a modem or other communication interface 53 and a modem or other communication interface 54. These communication interfaces provide connectivity for the exchange of information to and from the location server shown in FIG. 3 between three different networks, which are shown as networks 60, 62, and 64. The network 60 includes the mobile switching center or centers and/or the land-based phone system switches or the cell sites. An example of this network is shown in FIG. 2 wherein the GPS server 109 represents the server 50 of FIG. 3. Thus the network 60 may be considered to include the mobile switching centers 105 and 106 and the cells 102, 103, and 104. The network 64 may be considered to include the Applications Servers 114 and 116, which are each usually computer systems with communication interfaces, and also may include one or more "PSAP's," (Public Safety Answering Point) which is typically the control center which answers 911 emergency telephone calls. The network 62, which represents the SPS reference network 111 of FIG. 2, is a network of SPS receivers which are SPS reference receivers designed to provide differential SPS correction information and also to provide SPS signal data including the satellite ephemeris data to the data processing unit. When the server 50 serves a very large geographical area, a local optional SPS receiver, such as optional SPS receiver 56, may not be able to observe all SPS satellites that are in view of mobile SPS receivers throughout this area. Accordingly, the network 62 collects and provides satellite ephemeris data (typically, in one embodiment, as part of the entire raw satellite navigation message) and differential SPS correction data applicable over a wide area in accordance with the present invention.

As shown in FIG. 3, a mass storage device 55 is coupled to the data processing unit 51. Typically, the mass storage 55 will include storage for software for performing the GPS position calculations after receiving pseudoranges from the mobile GPS receivers, such as a receiver 102b of FIG. 2. These pseudoranges are normally received through the cell site and mobile switching center and the modem or other interface 53. The mass storage device 55 also includes software, at least in one embodiment, which is used to receive and use the satellite ephemeris data and differential SPS correction data provided by the GPS reference network 32 through the modem or other interface 54. The mass storage device 55 also will typically include a database which specifies the location of cell sites which are serviced by the GPS location server. These locations are used with the cellular pseudoranges to determine the position of a mobile unit such as an integrated communication system/GPS receiver.

In a typical embodiment of the present invention, the optional SPS receiver 56 is not necessary as the GPS reference network 111 of FIG. 2 (shown as network 62 of FIG. 3) provides the differential GPS information as well as the raw satellite navigation messages from the satellites in view of the various reference receivers in the GPS reference network. It will be appreciated that the satellite ephemeris data obtained from the network through the modem or other interface 54 may be used in a conventional manner with the pseudoranges obtained from the mobile GPS receiver in order to compute the position information for the mobile GPS receiver. The interfaces 52, 53, and 54 may each be a modem or other suitable communication interface for coupling the data processing unit to other computer systems, as in the case of network 64, and to cellular based communication systems, as in the case of network 60, and to transmitting devices, such as computer systems in the network 62. In one embodiment, it will be appreciated that the network 62 includes a plurality of GPS reference receivers dispersed over a geographical region. In some embodiments, the differential GPS correction information, obtained from a receiver 56 near the cell site or cellular service area which is communicating with the mobile GPS receiver through the cellular based communication system, will provide differential GPS correction information which is appropriate for the approximate location of the mobile GPS receiver. In other cases, differential corrections from the network 62 may be combined to compute a differential correction appropriate to the location of the GPS receiver.

FIG. 4 shows a generalized combined system which includes a SPS receiver and a communication system transceiver. In one example, the communication system transceiver is a cellular telephone. The system 75 includes a SPS receiver 76 having a SPS antenna 77 and a communication transceiver 78 having a communication antenna 79. The SPS receiver 76 is coupled to the communication transceiver 78 through the connection 80 shown in FIG. 4. In one mode of operation, the communication system transceiver 78 receives approximate Doppler information through the antenna 79 and provides this approximate Doppler information over the link 80 to the GPS receiver 76 which performs the pseudorange determination by receiving the SPS signals from the SPS satellites through the SPS antenna 77. The determined pseudoranges are then transmitted to a SPS location server through the communication system transceiver 78. Typically the communication system transceiver 78 sends a signal through the antenna 79 to a cell site which then transfers this information back to the SPS location server. Examples of various embodiments for the system 75 are known in the art. For example, U.S. Pat. No. 5,663,734 describes an example of a combined SPS receiver and communication system which utilizes an improved SPS receiver system. Another example of a combined SPS and communication system has been described in co-pending application Ser. No. 08/652,833, which was filed May 23, 1996. The system 75 of FIG. 4, as well as numerous alternative communication systems having SPS receivers will typically time stamp the time of the receipt of a message at the mobile unit and the time of transmission of a message from the mobile unit. In particular, the system 75 may use GPS time (received from the GPS satellites) or use time from CDMA transmissions (in a preferred embodiment) to time stamp the time of receipt at the mobile unit of a message and the time of transmission of another message from the mobile unit. Alternatively, because a CDMA signal is a spread spectrum (DSSS) signal, system 75 can derive time of travel of a one-way signal by despreading the received signal in order to provide a cellular pseudorange. The CDMA signal generated by a CDMA cell site is synchronized to GPS time, and it has both a spread spectrum code and data modulation. The spread spectrum code modulation allows a CDMA cellular receiver to determine, through a correlation operation, accurately the time of travel of a CDMA signal and the data modulation provides the time of transmission. In a preferred embodiment, the time of receipt of a message at the mobile unit and the time or transmission of another message from the mobile unit are determined at the mobile unit and transmitted from the mobile unit to a GPS location server through a cell site. These times will then be used at the GPS location server (together with the corresponding times from the cell site) to determine a cellular pseudorange for a message.

Figure 5:
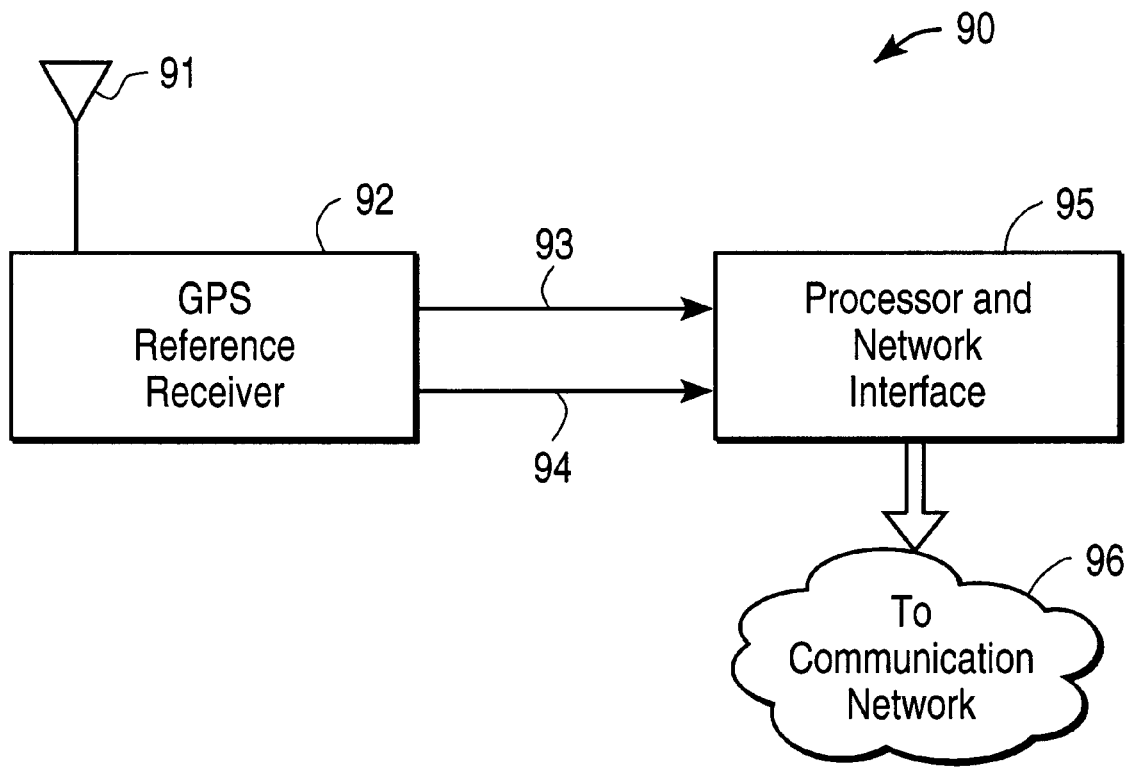
FIG. 5 shows an example of a GPS reference station which may be used in one embodiment of the present invention.

FIG. 5 shows one embodiment for a GPS reference station. It will be appreciated that each reference station may be constructed in this way and coupled to the communication network or medium. Typically, each GPS reference station, such as GPS reference station 90 of FIG. 5, will include a dual frequency GPS reference receiver 92 which is coupled to a GPS antenna 91 which receives GPS signals from GPS satellites in view of the antenna 91. GPS reference receivers are well known in the art. The GPS reference receiver 92, according to one embodiment of the present invention, provides at least two types of information as outputs from the receiver 92. Pseudorange outputs and/or pseudorange differential corrections 93 are provided to a processor and network interface 95, and these pseudorange outputs are used to compute pseudorange differential corrections in the conventional manner for those satellites in view of the GPS antenna 91. The processor and network interface 95 may be a conventional digital computer system which has interfaces for receiving data from a GPS reference receiver as is well known in the art. The processor 95 will typically include software designed to process the pseudorange data to determine the appropriate pseudorange correction for each satellite in view of the GPS antenna 91. These pseudorange corrections are then transmitted through the network interface to the communication network or medium 96 to which other GPS reference stations are typically also coupled. The GPS reference receiver 92 also provides a satellite ephemeris data output 94. This data is provided to the processor and network interface 95 which then transmits this data onto the communication network 96, which is included in the GPS reference network 111 of FIG. 2.

The satellite ephemeris data output 94 provides typically at least part of the entire raw 50 baud navigation binary data encoded in the actual GPS signals received from each GPS satellite. This satellite ephemeris data is part of the navigation message which is broadcast as the 50 bit per second data stream in the GPS signals from the GPS satellites and is described in great detail in the GPS ICD-200 document. The processor and network interface 95 receives this satellite ephemeris data output 94 and transmits it in real time or near real time to the communication network 96. As will be described below, this satellite ephemeris data which is transmitted into the communication network is later received through the network at various GPS location servers according to aspects of the present invention.

In certain embodiments of the present invention, only certain segments of the navigation message, such as the satellite ephemeris data message may be sent to location servers in order to lower the bandwidth requirements for the network interfaces and for the communication network. Typically also, this data may not need to be provided continuously. For example, only the first three frames which contain ephemeris information rather than all 5 frames together may be transmitted on a regular basis into the communication network 96. It will be appreciated that in one embodiment of the present invention, the location server may receive the entire navigation message which is transmitted from one or more GPS reference receivers into the network in order to perform a method for measuring time related to satellite data messages, such as the method described in co-pending U.S. patent application Ser. No. 08/794,649, which was filed Feb. 3, 1997, by Norman F. Krasner. As used herein, the term "satellite ephemeris data" includes data which is only a portion of the satellite navigation message (e.g. 50 baud message) transmitted by a GPS satellite or at least a mathematical representation of this satellite ephemeris data. For example, the term satellite ephemeris data refers to at least a representation of a portion of the 50 baud data message encoded into the GPS signal transmitted from a GPS satellite. It will be also understood that the GPS reference receiver 92 decoded the different GPS signals from the different GPS satellites in view of the reference receiver 92 in order to provide the binary data output 94 which contains the satellite ephemeris data.

Figure 6:
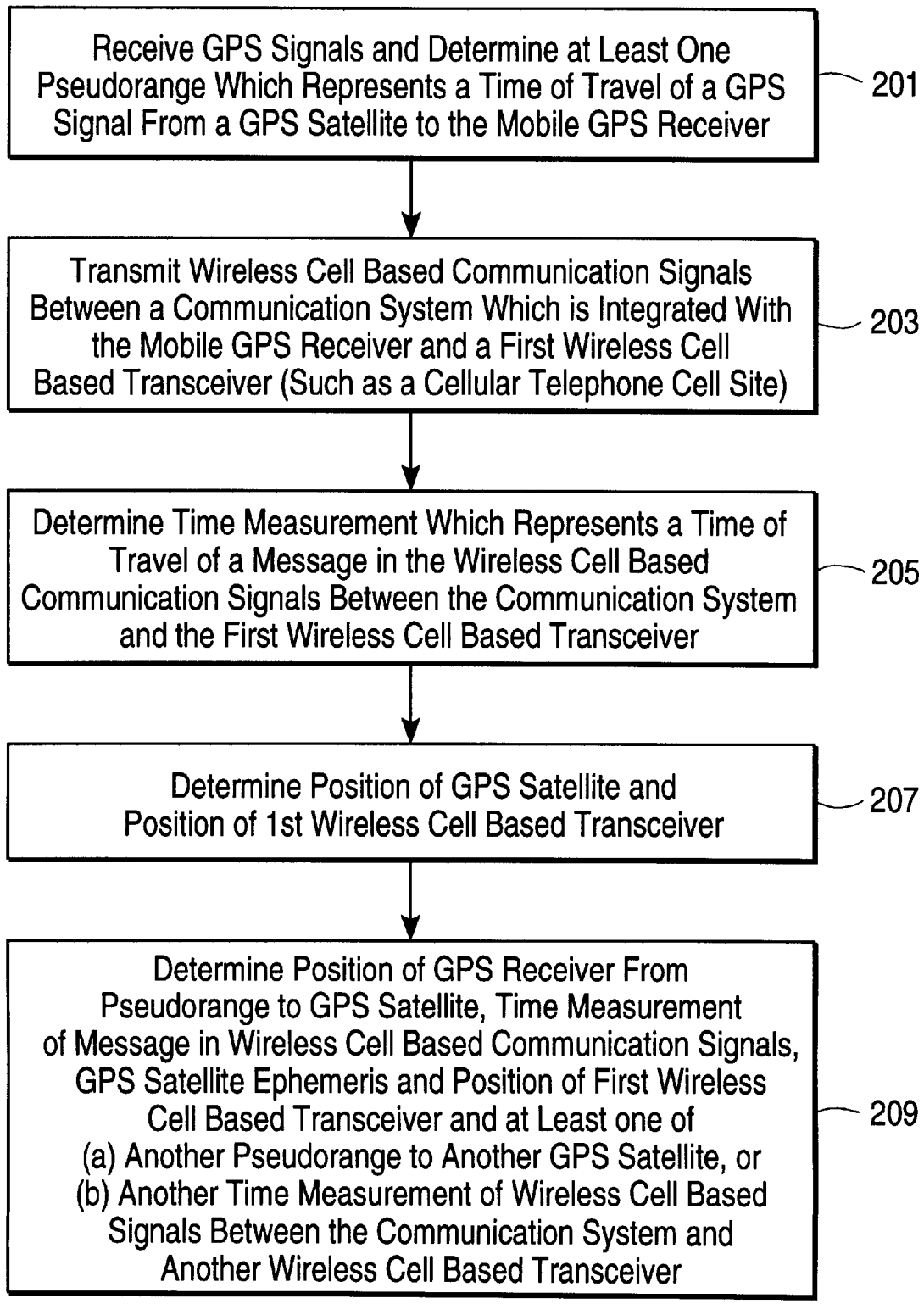
FIG. 6 shows an example of a method according to the present invention.

FIG. 6 shows an example of a method according to the present invention in which messages in a cell based communication signal are used to provide time measurements which may be used to augment time measurements from satellite positioning systems, such as the GPS system. In the present invention, the messages in the cell based communication signals are not embedded navigation signals which specify a position of the transmitter or are GPS-like signals. Rather, these messages may be arbitrary data such as voice or data messages and the messages may be typically communicated bi-directionally between the mobile communication system and the cell based transceiver or cell site. These messages may, for example, be Doppler or other aiding information (e.g. approximate location or time) provided from the cell site to the mobile integrated communication system/GPS receiver or it may be the 911 phone call from an integrated communication system/GPS receiver or it may be the pseudoranges to GPS satellites determined by the GPS receiver which are being communicated from the mobile unit back to the cell site and ultimately to a location server as in one embodiment of the present invention. Thus these messages are typically capable of bidirectional communication and may be arbitrary data and are not embedded navigation signals.

The method as shown in FIG. 6 begins at step 201 in which GPS signals are received in the mobile integrated communication system/GPS receiver and pseudoranges to at least one GPS satellite is determined. This one pseudorange represents a time of travel of a GPS signal from a GPS satellite to the mobile GPS receiver. In step 203, a transmission of a message in the wireless cell based communication signals occurs. From this transmission, in step 205, a time measurement is determined which represents a time of travel of a message in the wireless cell based communication signals between the communication system in the integrated communication system/GPS receiver and a wireless cell based transceiver at the first cell site. If the mobile integrated communication system/GPS receiver can communicate with several cell sites, then several time measurements that represent the times of travel of the messages between the mobile unit and several cell sites may be determined. The same or different messages may be sent between the mobile unit and several cell sites, and the time measurements may be obtained from these messages. These time measurements may be referred to as cellular pseudoranges or cell based pseudoranges. Having several cellular pseudoranges will tend to increase the chances of having a three-dimensional position determination, particularly if pseudoranges to at least two GPS satellites can also be determined.

In step 207, the positions of the GPS satellites at the time of collecting the data for determining the satellite pseudoranges and the position of the wireless cell based transceivers are determined. This position data will be used with the pseudorange data in order to determine the position of the mobile unit. In step 209, the position of the GPS receiver which is integrated with the communication system is determined from at least the pseudorange to at least one GPS satellite and from the time measurements of the message in the wireless cell based communication signals and from the GPS satellite ephemeris data and the position of a wireless cell based transceiver which was in communication with the communication system of the mobile integrated unit. Typically, the position is determined based upon additional information such as another pseudorange to another GPS satellite or another cellular pseudorange such as another time measurement of a message in the wireless cell based signals between the communication system and another wireless cell based transceiver. It will be appreciated that where cellular overlay exists between cells and where the communication system can communicate with two cell sites and where two GPS satellites have been acquired and their pseudoranges determined, four pseudoranges are available for use in determining the position of the mobile unit.

In one embodiment, the mobile unit itself may determine its position by receiving the satellite ephemeris data from the GPS satellites or from another source (e.g. through cell based communication signals), receiving or determining satellite and cellular pseudoranges, and by using a local database which specifies the position of a particular cell site or cell sites with which it is communicating messages in the cell based wireless communication system. In an alternative embodiment, a client-server architecture is used in which pseudorange measurements are transmitted to a location server, and the location server receives the satellite ephemeris data and also receives or otherwise determines the position of the cell sites which are communicating with the communication system in the integrated mobile unit.

Before describing another example of the invention, it is desirable to identify the unknowns in the system so that the minimum set of measurements and the combination thereof can be considered.

As far as a remote SPS receiver is concerned the unknowns are receiver clock error t(SPS_rcvr), and (x,y,z) for three-dimensional positioning or (xy) for two-dimensional positioning. As far as a cell site transceiver is concerned, the unknown is the transceiver clock error t(cell_trcvr). Cell site transceivers must be synchronized to some common system time be it GPS or some other time to be useful in ranging application. Irrespective of the chosen reference time, the cell site basestations cannot be perfectly synchronized. Any cell base synchronization timing errors result in the cellular pseudorange errors (1 nanosecond of timing error is equivalent to 1 foot of ranging error assuming that the signal propagates with speed of light). However, in the derivation of a minimum set of measurements below, it will be assumed that the synchronization between cell base transceivers is perfect. The location of a transceiver antenna at the cell site is assumed to be precisely known. Any error in the antenna location translates into a cellular pseudorange error.

Two-dimensional positioning is considered first. Three-dimensional positioning is a simple extension of a two-dimensional case.

In the case of a situation of cell basestation transceivers synchronized to GPS system time, there is a total of three unknowns: two spatial errors (x and y) and one temporal error. There is only one temporal error since the basestation transceiver clock t(cell_trcvr) and the SPS receiver clock t(SPS_rcvr) are slaved to the common reference time. Another way of looking at this is to consider the cellular pseudorange, which is the time of travel or difference of two times measured by SPS receiver and cellular transceiver clocks both synchronized to a common source of time—GPS system time. Three unknowns require three independent measurements: a combination of i SPS pseudoranges and j cellular pseudoranges where i+j is greater than or equal to 3. The preferred embodiment is to communicate with at least one cellular basestation in order to fulfill communication link requirements in the server/client architectural approach and enhanced 911 application in particular. Each independent cellular pseudorange requires a cell base transceiver producing a time measurement. Thus, i cellular pseudoranges means i separate cellular basestations making i time measurements.

In the case of a situation of cell basestation transceivers synchronized to non-GPS system time, there are a total of four unknowns: two spatial errors (x and y) and two temporal errors (the transceiver clock t(cell_trcvr) error and the SPS receiver clock t(SPS_rcvr) error).

Four unknowns require four independent measurements: a combination of i SPS pseudoranges and j cellular pseudoranges where i+j is greater than or equal to 4. For instance, in the TDOA overlay approach, each independent cellular TDOA measurement requires a pair of cell basestation transceivers generating time measurements. Thus, i cellular pseudoranges means i+1 separate cellular basestations making i+1 time measurements.

For three-dimensional positioning, since there is an addition unknown z, there is a need for an additional independent measurement. This measurement can be an additional cellular or SPS pseudorange, or a measurement based on some estimate of the altitude within the area of interest (altitude aiding).

Figure 7A:
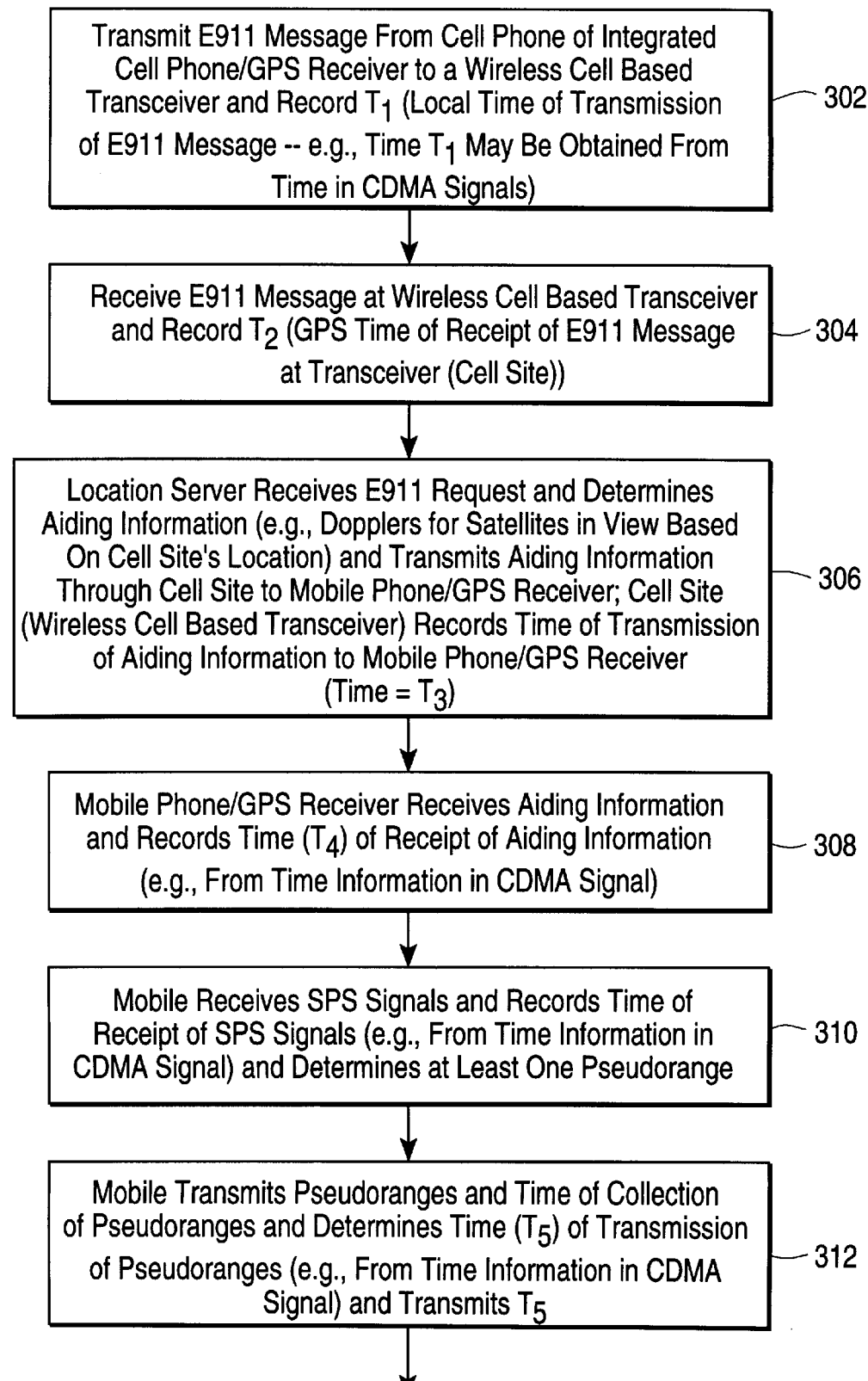
FIGS. 7A and 7B illustrate another example of a method according to the present invention.
Figure 7B:
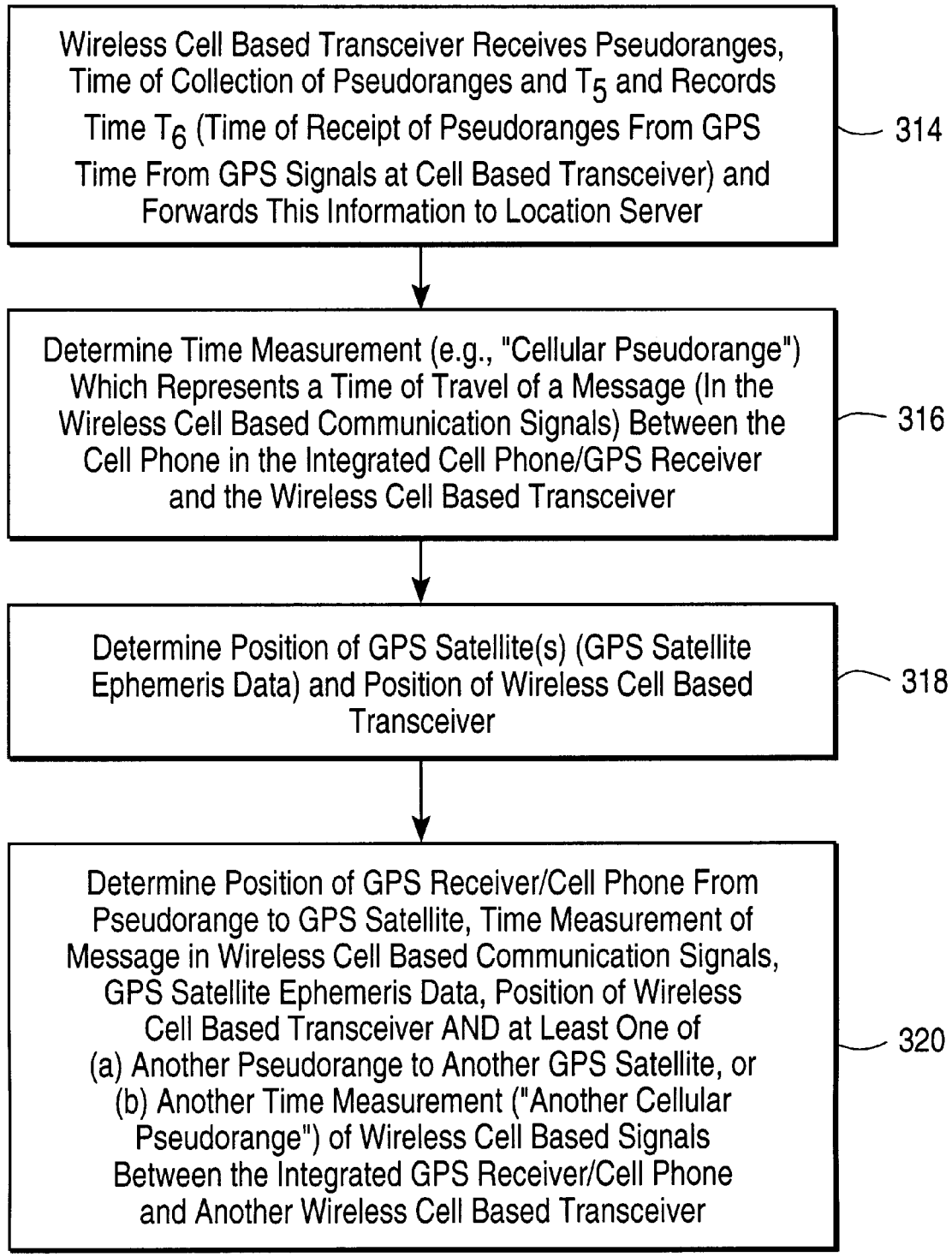

Another example of a method according to the present invention will now be described while referring to FIGS. 7A and 7B. In this example, the integrated mobile unit may be an integrated cell phone/GPS receiver which uses a CDMA type cell based communication signal protocol. Thus, the time of receipt of a message at the mobile unit may be obtained from the CDMA signals themselves and the time of transmission of a message from the mobile unit may also be obtained from the CDMA signals. A cell site may use either the CDMA signals to obtain time of receipt of a message at the cell site or time of transmission of a message from the cell site or may use GPS time obtained from a GPS reference receiver coupled to the cell site. The method shown in FIGS. 7A and 7B begins in step 302 in which a 911 message is transmitted from the cell phone to a wireless cell based transceiver (at the cell site). This 911 message is typically caused by a user dialing 911 on the cell phone. The time of transmitting this 911 message is recorded at the cell phone and this time is typically transmitted from the cell phone to the basestation or cell site. In step 304, the 911 message is received at the wireless cell based transceiver and the time of receipt of this message is also recorded. The time of transmission which is transmitted to the wireless cell based transceiver and the time of receipt of the message which is recorded at the wireless cell based transceiver is used to determine a cellular pseudorange for this 911 message and these times are typically forwarded to a GPS location server which will determine the cellular pseudorange. In step 306, a GPS location server receives the 911 request and determines aiding information for the GPS location operation. In one embodiment, this aiding information may include Doppler information for satellites in view based on the cell site's location and a specification of the satellites in view. The server transmits this aiding information through the cell site (the wireless cell based transceiver) to the mobile phone/ GPS receiver. The cell site records the time of transmission of this aiding information. The recorded time will be used in conjunction with the time of receipt at the mobile unit of the aiding information to determine another cellular pseudorange which may be used to determine the distance between this particular cell site and the mobile unit. It will be appreciated that this cellular pseudorange may be averaged with other cellular pseudoranges between the same cell site and the mobile unit.

In step 308, the mobile phone/GPS receiver receives the aiding information and records the time of receipt of this aiding information. The time of receipt may be obtained from time information in the CDMA signals or may be obtained from the time information in GPS signals if the mobile unit can read these time signals from the GPS signals from GPS satellites. In step 310, the mobile unit receives GPS satellite signals and records the time of receipt of these signals. The mobile unit may record the time of receipt of these signals from time information in the CDMA signal or in the GPS time signals in the GPS signals themselves. The mobile unit also determines, in one example, at least one satellite pseudorange if adequate signals from a GPS satellite can be obtained. Alternatively, the GPS signals may be collected and buffered and transmitted (with a time stamp) to the location server which determines the pseudoranges. In step 312, the mobile unit transmits the satellite pseudoranges it has determined for the various satellites which are in view and determines the time of transmission of these pseudoranges and transmits this time to the cell site which will forward this time to a location server. In step 314, the wireless cell based transceiver receives the satellite pseudoranges and the time of collection of these pseudoranges and also the time of transmission of the pseudoranges and also records the time of receipt of the pseudoranges from GPS time obtained at the cell based transceiver. This information is then forwarded to the location server which will perform the rest of the calculations required in order to determine the position of the mobile unit. In step 316, the location server determines at least one cellular pseudorange which represents a time of travel of a message in the wireless cell based communication signals between the cell phone in the integrated cell phone/GPS receiver and the wireless cell based transceiver. These cellular pseudoranges are determined from the transmission and receipt times of a particular message embedded in the cellular communication signals. In step 318 the location server determines the position of satellites and the position of the wireless cell based transceivers which were in communication with the mobile unit. The position of the GPS satellites may be determined from the GPS reference network or from an optional GPS reference receiver at the location server. The position of the wireless cell based transceivers which were communicating with the mobile unit may be obtained from a database which specifies a position for each wireless cell based transceiver in the system.

In step 320, the location server then determines the position of the GPS receiver/cell phone from at least the pseudoranges to the GPS satellite and the cellular pseudoranges and the position of the GPS satellites and the position of the wireless cell based transceivers and typically at least one additional information. If only one pseudorange to a GPS satellite is obtainable, the position (in two-dimensions) of the mobile unit may still be determined by using two cellular pseudoranges. When two satellite pseudoranges may be obtained, then a cellular pseudorange in combination with another cellular pseudorange may provide a three-dimensional position determination.

Although the methods and apparatus of the present invention have been described with reference to GPS satellites, it will be appreciated that the teachings are equally applicable to positioning systems which utilize pseudolites or a combination of satellites and pseudolites. Pseudolites are ground based transmitters which broadcast a pseudorandom PN code (similar to a GPS signal) modulated on an L-band carrier signal, generally synchronized with GPS time. Each transmitter may be assigned a unique PN code so as to permit identification by a remote receiver. Pseudolites are useful in situations where GPS signals from an orbiting satellite might be unavailable, such as tunnels, mines, buildings or other enclosed areas. The term "satellite", as used herein, is intended to include pseudolite or equivalents of pseudolites, and the term GPS signals, as used herein, is intended to include GPS-like signals from pseudolites or equivalents of pseudolites.

In the preceding discussion the invention has been described with reference to application upon the United States Global Positioning Satellite (GPS) system. It should be evident, however, that these methods are equally applicable to similar satellite positioning systems, and in, particular, the Russian Glonass system. The Glonass system primarily differs from GPS system in that the emissions from different satellites are differentiated from one another by utilizing slightly different carrier frequencies, rather than utilizing different pseudorandom codes. The term "GPS" used herein includes such alternative satellite positioning systems, including the Russian Glonass system.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for processing position information, said method comprising:

receiving in a SPS receiver SPS signals from at least one SPS satellite;

transmitting cell based communication signals between a communication system coupled to said SPS receiver and a first cell based transceiver which is remotely positioned relative to said SPS receiver wherein said cell based communication signals are wireless;

determining a first time measurement which represents a time of travel of a message in said cell based communication signals in a cell based communication system which comprises said first cell based transceiver and said communication system;

determining a second time measurement which represents a time of travel of said SPS signals;

determining a position of said SPS receiver from at least said first time measurement and said second time measurement, wherein said cell based communication signals are capable of communicating data messages in a two-way direction between said first cell based transceiver and said communication system.

2. A method as in claim 1 wherein said communication system comprises a mobile cell based transceiver which is integrated with said SPS receiver and wherein said cell based communication signals do not include embedded navigational signals.

3. A method as in claim 1 wherein said SPS receiver determines said second time measurement which comprises a pseudorange to said at least one satellite and said communication system transmits said pseudorange and said first time measurement to said first cell based transceiver which transmits said first time measurement and said pseudorange to a digital processing system which determines said position.

4. A method as in claim 3 wherein said digital processing system receives satellite ephemeris data and obtains basestation position data for said first cell based transceiver and wherein said position of said SPS receiver is determined from said pseudorange, said first time measurement, said satellite ephemeris data, said basestation position data and one of (a) a third time measurement which represents a time of travel of SPS signals from another SPS satellite to said SPS receiver or (b) a fourth time measurement which represents a time of travel of another message in said cell based communication signals in said cell based communication system which comprises said communication system and another cell based transceiver.

5. A method as in claim 1 wherein a time of transmitting said cell based communication signals is recorded and a time of receiving said cell based communication signals is recorded.

6. A method as in claim 5 wherein said time of transmitting and said time of receiving determine said first time measurement.

7. A method as in claim 6 wherein said SPS receiver determines said second time measurement which comprises a pseudorange to said at least one satellite and said communication system transmits said pseudorange and said first time measurement to said first cell based transceiver which transmits said first time measurement and said pseudorange to a digital processing system which determines said position.

8. A method as in claim 7 wherein said digital processing system receives satellite ephemeris data and obtains basestation position data for said first cell based transceiver and wherein said position is determined from said pseudorange, said first time measurement, said satellite ephemeris data and said basestation position data.

9. A method as in claim 6 wherein said position of said SPS receiver is determined from said first time measurement, said second time measurement and a third time measurement which represents a time of travel of SPS signals from another SPS satellite to said SPS receiver.

10. A method as in claim 6 wherein an SPS receipt time which represents a time of receiving SPS signals in said SPS receiver is determined from SPS signals, from a single SPS satellite, having a least amount of signal attenuation.

11. A method as in claim 6 wherein said cell based communication signals are used to communicate Doppler information of satellites in view of said SPS receiver to said SPS receiver from said first cell based transceiver and to communicate said second time measurement to said first cell based transceiver.

12. A method for processing position information in a digital processing system, said method comprising:

determining a first time measurement which represents a time of travel of a message in cell based communication signals in a cell based communication system which comprises a first cell based transceiver which communicates with said digital processing system and a communication system which communicates in a wireless manner with said first cell based transceiver;

determining a position of a SPS receiver from at least said first time measurement and a second time measurement which represents a time of travel of SPS signals received at said SPS receiver which is integrated with said communication system and is remotely located relative to said first cell based transceiver and said digital processing system, wherein said cell based communication signals are capable of communicating messages from said communication system to said first cell based transceiver.

13. A method as in claim 12 wherein said cell based communication signals are capable of communicating messages bi-directionally between said first cell based transceiver and said communication system and wherein said position of said SPS receiver is determined from said first time measurement, said second time measurement and one of (a) a third time measurement which represents a time of travel of SPS signals from another SPS satellite to said SPS receiver or (b) a fourth time measurement which represents a time of travel of another message in said cell based communication signals in said cell based communication system which comprises said communication system and another cell based transceiver.

14. A method as in claim 13 wherein said messages comprise voice messages.

15. A method as in claim 13 wherein said second time measurement is determined in said SPS receiver, and wherein said second time measurement is transmitted from said communication system to said first cell based transceiver.

16. A method as in claim 15 wherein said cell based communication signals do not include embedded navigational signals.

17. A method as in claim 15 wherein said second time measurement comprises a pseudorange to a SPS satellite and said first cell based transceiver transmits said pseudorange to said digital processing system which receives satellite ephemeris data and obtains basestation position data representing a position of said first cell based transceiver, and wherein said position of said SPS receiver is determined from said pseudorange, said first time measurement, said satellite ephemeris data and said basestation position data.

18. A method as in claim 17 wherein a time of transmitting said message in said cell based communication signals is recorded and a time of receiving said message in said cell based communication signals is recorded.

19. A method as in claim 18 wherein said time of transmitting and said time of receiving determine said first time measurement.

20. A system for processing position information, said system comprising:

a SPS receiver which receives SPS signals from at least one SPS satellite and a communication system coupled to and integrated with said SPS receiver;

a first cell based transceiver which is remotely positioned relative to said SPS receiver and communicates in a wireless manner with said communication system using cell based communication signals;

a digital processing system coupled to said first cell based transceiver, said digital processing system determining a position of said SPS receiver from at least a first time measurement and a second time measurement, wherein said first time measurement represents a time of travel of a message in said cell based communication signals in a cell based communication system which comprises said first cell based transceiver and said communication system, and wherein said second time measurement represents a time of travel of said SPS signals, and wherein said cell based communication signals are capable of communicating data messages in a two-way direction between said first cell based transceiver and said communication system.

21. A system as in claim 20 wherein said cell based communication signals do not include embedded navigational signals.

22. A system as in claim 20 wherein said SPS receiver determines said second time measurement which comprises a pseudorange to a SPS satellite and said communication system transmits said pseudorange to said first cell based transceiver which transmits said pseudorange to said digital processing system.

23. A system as in claim 22 wherein said digital processing system receives satellite ephemeris data and obtains basestation position data for said first cell based transceiver and wherein said position of said SPS receiver is determined from said pseudorange, said first time measurement, said satellite ephemeris data and said basestation position data.

24. A system as in claim 23 wherein a time of transmitting said message in said cell based communication signals is recorded and a time of receiving said message in said cell based communication signals is recorded and wherein said time of transmitting and said time of receiving determine said first time measurement.

25. A system as in claim 24 wherein said message comprises said pseudorange.

26. A system as in claim 24 wherein said message comprises Doppler information for satellites in view of said SPS receiver.

27. A system as in claim 24 wherein said message comprises a 911-like message from said communication system.

28. A system as in claim 24 wherein said position of said SPS receiver is determined from said pseudorange, said first time measurement, said satellite ephemeris data, said basestation position data and one of (a) a third time measurement which represents a time of travel of SPS signals from another SPS satellite to said SPS receiver, or (b) a fourth time measurement which represents a time of travel of another message in said cell based communication signals in said cell based communication system which comprises said communication system and another cell based transceiver, or (c) an approximate altitude of said SPS receiver.

29. A method as in claim 6 wherein said position of said SPS receiver is determined from said first time measurement, said second time measurement and one of (a) a third time measurement which represents a time of travel of SPS signals from another SPS satellite to said SPS receiver or (b) an approximate altitude of said SPS receiver.

30. A mobile integrated system comprising a satellite positioning system (SPS) receiver and a cell based communication system, said mobile integrated system comprising:

a SPS receiver capable of receiving SPS signals and providing data for determining a first time measurement which represents a time of travel of SPS signals from a SPS satellite to said SPS receiver;

a communication system capable of communicating in a wireless manner with a remotely located cell based transceiver and capable of providing data for determining a second time measurement which represents a time of travel of a message in cell based communication signals between said communication system and said remotely located cell based transceiver, wherein said cell based communication signals are capable of communicating messages between said communication system and said remotely located cell based transceiver, and wherein said SPS receiver is coupled to said communication system.

31. A mobile integrated system as in claim 30 wherein a position of said mobile integrated system is determined from a combination of at least said first time measurement and said second time measurement.

32. A mobile integrated system as in claim 31 wherein said SPS satellite is a GPS satellite which is orbiting the earth, and wherein said combination is in a measurement domain defined by said first and said second time measurements.

33. A mobile integrated system as in claim 30 wherein said cell based communication signals do not include embedded navigational signals.

34. A mobile integrated system as in claim 30 wherein said mobile integrated system determines said second time measurement.

35. A mobile integrated system as in claim 31 wherein a remotely located digital processing system determines said second time measurement and said position.

36. A mobile integrated system as in claim 34 wherein said mobile integrated system determines a position of said mobile integrated system.

37. A mobile integrated system as in claim 31 wherein said position is determined from said first time measurement and said second time measurement and one of (a) a third time measurement which represents a time of travel of SPS signals from another SPS satellite to said SPS receiver or (b) a fourth time measurement which represents a time of travel of another message in said cell based communication signals in said cell based communication system which comprises said communication system and another cell based transceiver.

38. A mobile integrated system as in claim 32 wherein said mobile integrated system receives satellite ephemeris data for at least said SPS satellite in said cell based communication signals.

* * * * *